UNITED STATES PATENT OFFICE.

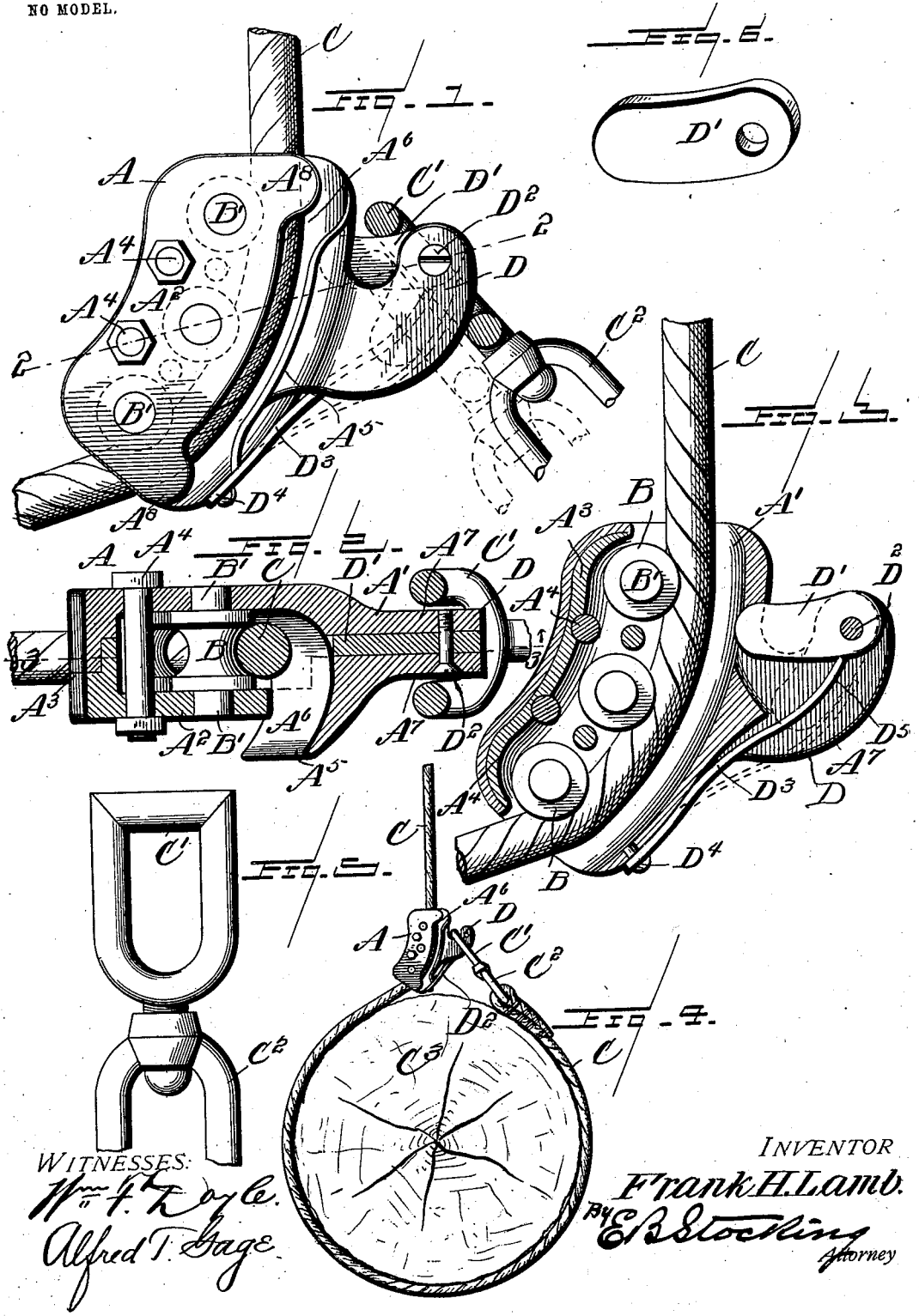

FRANK H. LAMB, OF HOQUIAM, WASHINGTON.

BRIDLE FOR CABLEWAY SYSTEMS.

SPECIFICATION forming part of Letters Patent No. 722,721, dated March 17, 1903.

Application filed December 13, 1902. Serial No. 135,129. (No model.)

*To all whom it may concern:*

Be it known that I, FRANK H. LAMB, a citizen of the United States, residing at Hoquiam, in the county of Chehalis, State of Washington, have invented certain new and useful Improvements in Bridles for Cableway Systems, of which the following is a specification, reference being had therein to the accompanying drawings.

This invention relates to a bridle for cableway systems, and particularly to a bridle adapted to slide upon a hauling-line and provided with a hook adapted to retain the free end of said line when passed around a load.

The invention has for an object to improve the construction of bridle, so as to permit the ready introduction of the line therein and to afford a bearing for the line which permits a free movement of the bridle thereon.

A further object of the invention is to provide a latch adapted to release the free end of the line from the bridle when the line is slackened.

Other and further objects and advantages of the invention will be hereinafter set forth, and the novel features thereof defined by the appended claims.

In the drawings, Figure 1 is a side elevation of the bridle in position upon a hauling-line; Fig. 2, a horizontal section on the line 2 2 of Fig. 1; Fig. 3, a vertical section on the line 3 3 of Fig. 2; Fig. 4, an elevation showing the invention applied to a load; Fig. 5, a detail of a link secured to the free end of the line, and Fig. 6 a detail perspective of the latch.

Like letters of reference refer to like parts in the several figures of the drawings.

The letter A designates a bridle, which is preferably formed of a body A' and a front plate $A^2$, which are formed with an overlapping joint $A^3$ at one side of the bridle and provided with journaling-apertures in alinement with each other, adapted to receive the pintles B' of the bearing-rollers B, while the body and front plate are secured together by bolts $A^4$ of any desired construction. Between the free edge of the front plate $A^2$ and overhanging lip $A^5$ of the body an opening $A^6$ is provided, of sufficient diameter to permit the introduction of the line or cable C into the bridle from one side thereof and without the necessity of threading the same therethrough.

At one side of the bridle a hook D is provided and adapted to receive any desired form of loop upon the free end of the hauling-line C—for instance, a link C', adapted to be connected to the line by means of an eye $C^2$, as shown in Fig. 4. This hook is provided with a latch-plate D', pivotally mounted therein at $D^2$ and normally projected outward by means of a tension-spring $D^3$, secured at one end $D^4$ to the body of the bridle and bearing at its free end $D^5$ against the back of the latch-plate D', said spring being disposed between ears $A^7$, forming part of the hook D. The channel through the bridle is disposed upon a curved line to facilitate the operation of the bridle upon the hauling-line, and the front plate thereof is provided at its ends with lugs $A^8$, extending outward therefrom to assist in retaining the cable within the channel and upon the bearing-rollers.

In the operation of the invention the load to be lifted—for instance, a log, as shown at $C^3$ in Fig. 4—is surrounded by the hauling-line C, and the draft thereon causes the link C' to press the latch inward, while the movement of the hauling-line through the bridle to draw the same taut is facilitated by the rollers B. The disposition of the opening at one side of the bridle permits the hauling-line to be inserted therein at any time, and when the line is slackened the latch under spring-pressure will force the link at the free end from the hook, as shown by full lines in Fig. 1, while as soon as strain is applied upon the line the link will enter the hook, as shown by dotted lines in said figure.

It will be obvious that the bearing-rollers may be omitted from the bridle, if found desirable, as well as the unhooking-latch, while other changes may be made in the details of construction and configuration without departing from the spirit of the invention as defined by the appended claims.

Having described my invention and set forth its merits, what I claim, and desire to secure by Letters Patent, is—

1. A device of the class described comprising a casing to receive a hauling-line having a curved channel therethrough, a hook for the free end of said line at one side of said channel, and bearing-rollers pivoted in said casing at one side of said channel and adapted to contact with said line; substantially as specified.

2. A device of the class described comprising a casing to receive a hauling-line having a curved channel therethrough, a hook for the free end of said line at one side of said channel, bearing-rollers pivoted in said casing at one side of said channel and adapted to contact with said line, a pivoted latch-plate mounted in said hook, and a spring to normally project said plate; substantially as specified.

3. In a device of the class described, a casing having a channel therein and an opening at one side of said channel for the introduction of a hauling-line, and a hook for the free end of said line at one side of said channel; substantially as specified.

4. In a device of the class described, a casing having a channel therein for a hauling-line, a hook at one side of said channel, a latch-plate pivoted in said hook, and a tension-spring to normally project said plate; substantially as specified.

5. In a device of the class described, a casing having a channel therein for a hauling-line, a hook at one side of said channel, a latch-plate pivoted in said hook, a tension-spring to normally project said plate, and a link secured to the free end of said line to enter said hook; substantially as specified.

6. In a device of the class described, a body portion, a front plate thereto, bearing-rollers journaled in said body and plate, and an overhanging flange from said body extending beyond the face of said plate; substantially as specified.

7. In a device of the class described, a body portion, a front plate thereto, bearing-rollers journaled in said body and plate, an overhanging flange from said body extending beyond the face of said plate, a hook carried by said body and provided with parallel ears, a latch-plate pivoted between said ears, and a spring secured to the body and bearing on said plate to normally project the same; substantially as specified.

In testimony whereof I affix my signature in presence of two witnesses.

FRANK H. LAMB.

Witnesses:
R. E. DAWDY,
WILHELM JENSEN.